United States Patent
Morishita et al.

(10) Patent No.: US 11,412,763 B2
(45) Date of Patent: Aug. 16, 2022

(54) MALT BEVERAGE HAVING SUPPRESSED GRAIN ODOR

(71) Applicants: Asahi Group Holdings, Ltd., Tokyo (JP); ASAHI BREWERIES, LTD., Tokyo (JP)

(72) Inventors: Tamaki Morishita, Ibaraki (JP); Shigekuni Noba, Ibaraki (JP); Hiroo Yamaguchi, Ibaraki (JP); Daisuke Shibata, Ibaraki (JP)

(73) Assignees: ASAHI GROUP HOLDINGS, LTD., Tokyo (JP); ASAHI BREWERIES, LTD., Tokyo (JP)

(*) Notice: Subject to any disclaimer, the term of this patent is extended or adjusted under 35 U.S.C. 154(b) by 302 days.

(21) Appl. No.: 16/493,083

(22) PCT Filed: Jan. 23, 2018

(86) PCT No.: PCT/JP2018/001865
§ 371 (c)(1),
(2) Date: Sep. 11, 2019

(87) PCT Pub. No.: WO2018/179725
PCT Pub. Date: Oct. 4, 2018

(65) Prior Publication Data
US 2021/0186060 A1    Jun. 24, 2021

(30) Foreign Application Priority Data

Mar. 31, 2017 (JP) ............................ JP2017-071595

(51) Int. Cl.
*C12C 5/02* (2006.01)
*A23L 2/38* (2021.01)
*A23L 27/00* (2016.01)
*A23L 2/56* (2006.01)

(52) U.S. Cl.
CPC ............. *A23L 2/382* (2013.01); *A23L 2/56* (2013.01); *A23L 27/84* (2016.08); *C12C 5/026* (2013.01); *A23V 2002/00* (2013.01)

(58) Field of Classification Search
CPC . A23L 33/105; A23L 2/52; A23L 2/56; A23L 33/10; A23L 27/84; A23L 27/88; A23L 2/382; C12C 5/026; C12C 5/02; C12C 5/00
See application file for complete search history.

(56) References Cited

U.S. PATENT DOCUMENTS

| | | |
|---|---|---|
| 2012/0021110 A1 | 1/2012 | Katayama et al. |
| 2012/0263659 A1 | 10/2012 | Subkowski et al. |
| 2015/0086491 A1 | 3/2015 | Subkowski et al. |
| 2017/0318848 A1 | 11/2017 | Takeuchi et al. |

FOREIGN PATENT DOCUMENTS

| | | |
|---|---|---|
| CN | 1875088 | 12/2006 |
| JP | 11-276151 | 10/1999 |
| JP | 2012-029630 | 2/2012 |
| JP | 2012-029642 | 2/2012 |
| JP | 2013-511270 | 4/2013 |
| JP | 2014-033638 | 2/2014 |
| JP | 2014-217347 | 11/2014 |
| JP | 2015-47135 | 3/2015 |
| JP | 2015-536674 | 12/2015 |
| JP | 2017-143842 | 8/2017 |
| JP | 2018-027075 | 2/2018 |
| WO | 2005/042680 | 5/2005 |
| WO | 2010/079778 | 7/2010 |
| WO | 2011/061330 | 5/2011 |
| WO | 2014/090803 | 6/2014 |
| WO | 2016/084976 | 6/2016 |

OTHER PUBLICATIONS

Nance, Marceline R. and William N. Setzer, Volatile Components of Aroma Hops (*Humulus lupulus* L.) Commonly Used in Beer Brewing, Journal of Brewing and Distilling vol. 2(2) pp. 16-22, Apr. 2011. (Year: 2011).*
Examination Report No. 1 for Standard Patent Application dated Nov. 25, 2021 in corresponding Australian Application No. 2018245595, 3 pages.
International Search Report dated Apr. 24, 2018 in International (PCT) Patent Application No. PCT/JP2018/001865.
International Preliminary Report on Patentability dated Oct. 1, 2019 in International (PCT) Patent Application No. PCT/JP2018/001865.
Bishop, "The Measurement of Bitterness in Beers", J. Inst. Brew., 1964, vol. 70, Issue 6, pp. 489-497.
Bishop, "European Brewery Convention, The EBC Scale of Bitterness", J. Inst. Brew., 1967, vol. 7, Issue 6, pp. 525-527.
Polaris, "YCH HOPS", Dec. 21, 2016, retrieved on Apr. 13, 2018, <URL:https://ychhops.com/varieties/polaris.
Extended European Search dated Jan. 13, 2021 in European Patent Application No. 18777892.3.
Australian Examination Report dated Feb. 15, 2022 in corresponding Australian Application No. 2018245595, 3 pages.

* cited by examiner

*Primary Examiner* — Hong T Yoo
(74) *Attorney, Agent, or Firm* — Wenderoth, Lind & Ponack, L.L.P.

(57) ABSTRACT

The problem of the invention is to provide a malt beverage which has rich feeling, a reduced grain smell, and can also be produced at a low cost. The means for solving the problem is a malt beverage containing δ-cadinene at a concentration of 3-10 ppb.

5 Claims, 3 Drawing Sheets

MALT BEVERAGE HAVING SUPPRESSED GRAIN ODOR

TECHNICAL FIELD

The present invention relates to a malt beverage, in particular relates to a beer-like malt beverage.

BACKGROUND ART

A malt beverage refers to a beverage produced using malt as a raw material. For example, a beverage obtained by fermenting a saccharide solution derived from malt, a beverage obtained by mixing a saccharide solution derived from malt and the like fall under the malt beverage. A beer-like malt beverage and the like are specific examples of the malt beverage.

Beer refers to a beverage obtained from malt, hops, water as raw materials, and by fermenting them using yeast. A beer-like malt beverage refers to the malt beverage designed so that the taste and flavor become similar to those of beer. The beer-like malt beverage may be fermented or non-fermented. Beer and a sparkling liquor, and a beverage, in which a saccharide solution derived from malt, hops, flavoring agents and carbon dioxide, etc. are mixed, are included in the beer-like malt beverage. In the beer-like malt beverage, so-called non-alcohol beer substantially not containing alcohol is also included.

Wort as a raw material of the malt beverage is produced by crushing grain including malt, mixing it with auxiliary raw materials and water, heating them to thereby saccharify starch, adding hops to the resulting saccharide solution followed by further boiling. A process of heating malt and the like together with water is generally referred to as saccharification, and a process of boiling the saccharide solution is referred to as wort boiling. The meaning of the term wort may include a saccharide solution obtained after saccharification.

Wort has a taste and grain smell derived from malt and hops. The higher the malt use ratio, the more rich feeling, body feeling and aroma, that are characteristic of beer, are imparted to a beer-like malt beverage. On the other hand, the grain smell of wort makes the flavor of the beer-like malt beverage thick and heavy if excessively present, which brings negative influence on the preferences of beer-like malt beverages.

A grain smell of the malt beverage can be reduced by lowering the use ratio of malt that is the origin. However, in such an occasion, a nitrogen compound derived from malt is deficient in wort, so that umami and rich feeling of beers are also impaired. Furthermore, since the nitrogen compound is also a nutritional source for yeast, its depletion causes fermentation disorder. As a result, an unpleasant odor called fermentation disorder odor is imparted to beers.

Patent Document 1 discloses that the pH is adjusted to a low value in a specific range when wort boiling is conducted to produce a beer-like malt beverage with a reduced grain smell. However, if wort boiling is carried out at a low pH, thereafter, a step of adjusting the pH to high values again is also required in order to remove protein from wort. As a result, man-hours, workload and working hours increase, resulting in an increase in production cost.

Patent Document 2 discloses that cubebol or δ-cadinene, that is its decomposed product, are added to a beer-taste beverage, so that flavor deterioration of the beer-taste beverage due to oxidation is suppressed. However, this is different from the grain smell in that flavor due to oxidation degradation does not exist in the beginning. Also, Patent Document 2 discloses that an example of substances derived from the flavor deterioration of the above beer taste beverage includes trans-2-nonenal or citral. They are different from a causative substance of the grain smell of malt beverages.

PRIOR ART DOCUMENTS

Patent Documents

Patent Document 1: JP 2014-33638 A
Patent Document 2: JP 2014-217347 A

SUMMARY OF INVENTION

Problems to be Solved by Invention

The present invention solves the above conventional problems, and an object thereof is to provide a malt beverage which has a reduced grain smell while maintaining rich feeling, and which can also be produced at a low cost.

Means for Solving Problems

The present invention provides a malt beverage containing δ-cadinene at a concentration of 3-10 ppb.

The present invention provides a malt beverage containing cubebol at a concentration of 3-20 ppb.

The present invention provides a malt beverage containing δ-cadinene at a concentration of 3-10 ppb, and containing cubebol at a concentration of 3-20 ppb.

In one embodiment, the malt beverage further contains at least one sesquiterpenes selected from the group consisting of 4-epi-cubebol, α-cadinol, 60-cubebene, γ-muurolene, α-amorphene and α-muurolene, and derivatives thereof.

In one embodiment, any one of the sesquiterpenes and derivatives thereof is contained in an amount such that the peak area ratio is 0.2-3.0 measured using a GC/MS device with 6 ppb concentration of D-linalool serving as an internal standard.

In one embodiment, the malt beverage contains sesquiterpenes derived from Polaris-variety hops and derivatives thereof.

In one embodiment, the malt beverage has a bitterness value of 10° European Brewery Convention (EBC) or more.

In one embodiment, grain as a raw material of the malt beverage contains 25 wt % or more of malt.

In one embodiment, the malt beverage is a beer-like fermented malt beverage.

Also, the present invention provides a method for reducing a grain smell of a malt beverage, wherein the method comprises including δ-cadinene at a concentration of 3-10 ppb, and including cubebol at a concentration of 3-20 ppb.

In one embodiment, the method for reducing a grain smell of a malt beverage further includes adjusting the bitterness value to 10° EBC or more.

Furthermore, the present invention provides a malt beverage for experiencing a cool feeling, wherein the malt beverage contains δ-cadinene at a concentration of 3-10 ppb, and contains cubebol at a concentration of 3-20 ppb.

In one embodiment, the malt beverage for experiencing a cool feeling has a bitterness value of 10° EBC or more.

Effect of Invention

According to the method of the present invention, a malt beverage is provided which has a reduced grain smell while maintaining rich feeling, and which can be produced at a low cost. The malt beverage of the present invention achieves a flavor with a modest grain smell, and particularly improves in ease of drinking and sharp feeling.

DESCRIPTION OF EMBODIMENTS

Figure 1:
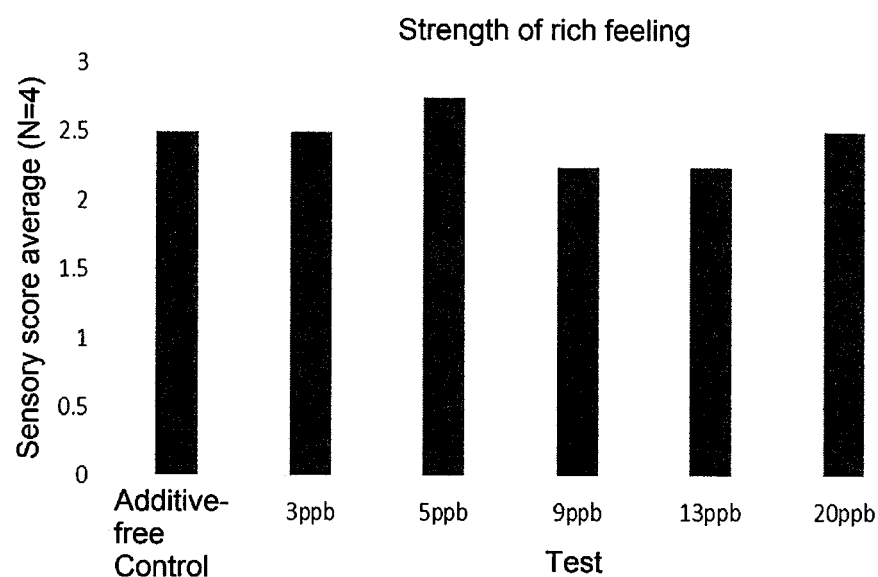
FIG. 1 is a graph showing the relationship between the strength of rich feeling of beer and the δ-cadinene concentration.

The inventors of the present invention found that, by including specific amounts of δ-cadinene and cubebol in a malt beverage, a grain smell of the malt beverage could be reduced. Moreover, it was also found that, in such an occasion, rich feeling of the malt beverage was not substantially affected. Cubebol or δ-cadinene may be used alone, or may be mixed and included. Preferably, cubebol and δ-cadinene are included as a mixture.

In the malt beverage of the present invention, the content of δ-cadinene is adjusted within a range of 3-10 ppb in concentration. When the concentration of cadinene is less than 3 ppb, the grain smell stands out, and sharp feeling becomes insufficient. When it exceeds 10 ppb, a flavor balance becomes worse. The content of δ-cadinene is preferably 5-8 ppb in concentration.

In the malt beverage of the present invention, the content of cubebol is adjusted within a range of 3-20 ppb in concentration. When the concentration of cubebol is less than 3 ppb, the grain smell stands out, and sharp feeling becomes insufficient. When it exceeds 20 ppb, a flavor balance becomes worse. The content of cubebol is preferably 8-14 ppb in concentration.

The concentration of δ-cadinene or cubebol can be measured using a GC/MS device. Specifically, first, 10 mL of a test sample was adjusted to have a pH of 9 using sodium hydroxide, and then mixed with 40 mL of hexane to perform hexane extraction. Subsequently, a hexane layer after the extraction was concentrated to 1 mL by evaporation. This concentrated solution was subjected to the GC/MS device.

A method for including δ-cadinene and cubebol in the malt beverage is not particularly limited. δ-cadinene and cubebol may be included by adding them to the malt beverage, and may also be included by adjusting the kind and amount of raw material used.

An example of a raw material containing δ-cadinene and cubebol includes Polaris-variety hops. Hops are raw materials used in producing a beer-like malt beverage for the purpose of imparting bitterness and refreshing aroma to beer, improving foam retention, and improving microbial durability. Furthermore, the form of hops added as raw materials may be hop pellets, and may also be hop extract. δ-cadinene and cubebol are included in a malt beverage when, for example, Polaris-variety hops are used as raw materials. For example, all or part of the hops of a commonly used variety may be replaced with Polaris-variety hops. When part of the hops of commonly used variety is replaced with Polaris-variety hops, the amount of Polaris-variety hops used is adjusted, as needed, to 3 wt % or more of commonly used hops, preferably within a range of 7-50 wt %, and more preferably 10-30 wt %, considering the contents of δ-cadinene and cubebol, and the flavor of the malt beverage.

When Polaris-variety hops are used when producing a malt beverage, sesquiterpenes and derivatives thereof are also included in the malt beverage besides δ-cadinene and cubebol. Sesquiterpenes refer to a series of compounds having the chemical formula of $C_{15}H_{24}$. Examples of such sesquiterpenes and derivatives thereof include 4-epi-cubebol, α-cadinol, α-cubebene, γ-muurolene, α-amorphene, and α-muurolene.

It is considered that components derived from Polaris-variety hops, in particular the above sesquiterpenes and derivatives thereof increase the effect of reducing the grain smell. Therefore, it is preferred that the malt beverage of the present invention contains a component derived from Polaris-variety hops, in particular the at least one of the above sesquiterpenes and derivatives thereof.

The content of hop-derived components may be a concentration generated in a malt beverage when Polaris-variety hops are used for producing the malt beverage. For example, it is an amount such that the peak area ratio is 0.2-3.0, preferably 0.5-2.5, and more preferably 0.8-1.6, measured using a GC/MS device with 6 ppb concentration of D-linalool serving as an internal standard.

When δ-cadinene and cubebol are included in a malt beverage intended to reduce the grain smell, they can be included in a suitable step in the malt beverage production process. For example, when they are included in a beer-like fermented malt beverage, it may be any step such as before a saccharification step of a raw material solution such as wort, during boiling of wort, a cooling step after boiling of wort, a fermentation step or an aging step.

The production of a malt beverage of the present invention is carried out in the same manner as in the method and conditions which are commonly carried out when producing beer or a beer-like beverage except that δ-cadinene and cubebol are included. For example, first, a malt crushed product, auxiliary raw materials such as barley, and warm water are added to a preparation tank, and mixed to prepare maische. The preparation of maische can be carried out by a conventional method, for example, can be carried out by holding at 35-60° C. for 20-90 minutes. Also, as necessary, a diastatic enzyme described below, an enzyme agent such as protease, flavor components such as spices and herbs, and the like may be added besides the main raw material and the auxiliary raw materials.

Grain subjected to saccharification contains malt. The content of malt in the grain subjected to saccharification is not particularly limited. It may be 25 wt % or more, preferably 50 wt % or more, and more preferably 67 wt % more. The grain subjected to saccharification may be 100% malt. The more the content of malt in the grain, the stronger umami and rich feeling derived from malt in the obtained wort become. Furthermore, the more the content of malt in the grain, the more the content of a nitrogen compound in the obtained wort. Thus, fermentation disorder hardly occurs when the wort is subjected to fermentation, and an unpleasant odor hardly occurs.

Malt contains 2-acetylpyrroline as an aroma component. The higher the use ratio of malt, the higher the concentration of 2-acetylpyrroline concentration contained in a malt beverage. The malt beverage of the present invention preferably has a high malt use ratio, and preferably contains 2-acetylpyrroline in an amount of 0.2 ppb or more in concentration.

Thereafter, the temperature of the maische was gradually raised followed by holding at a predetermined temperature for a fixed period to saccharify starch using an enzyme derived from malt or an enzyme added to the maische. The temperature and time during the saccharification treatment can be determined as needed, considering the kind of enzyme used and the amount of maische, the quality of the intended malt alcoholic beverage and the like. For example, it can be carried out by holding it at 60-72° C. for 30-90 minutes. After the saccharification treatment, having been held at 76-78° C. for about 10 minutes, the maische is filtered in a wort filtration tank to obtain a transparent saccharide solution. Furthermore, an appropriate amount of an enzyme drug may also be added when carrying out the saccharification treatment.

The auxiliary raw materials mean raw materials other than malt and hops. As the auxiliary raw materials, there are, for example, starch raw materials such as barley, wheat, corn starch, corn grits, rice, and kaoliang; carbohydrate raw materials such as liquid saccharide and sugar. Here, liquid saccharide is a substance obtained by decomposing, and saccharifying starch using an acid or a diastatic enzyme, and mainly contains glucose, maltose, maltotriose and the like. Besides them, spices and herbs used for imparting or improving flavor are also included in the auxiliary raw materials.

The diastatic enzyme means an enzyme for decomposing starch into saccharide. As the diastatic enzyme, there are, for example, α-amylase, glucoamylase, pullanase and the like.

Grain subjected to saccharification includes malt. The content of malt in the grain used for saccharification is not particularly limited. It is 5 wt % or more, preferably 50 wt % or more, and more preferably 67 wt % or more. The grain used for saccharification may be 100% malt. The more the content of malt in the grain, the stronger umami and rich feeling derived from malt in the obtained wort become.

Wort boiling operation is preferably carried out according to the method and conditions which are commonly carried out when producing beer or a beer-like beverage. For example, a saccharide solution, of which pH has been adjusted, is transferred to a boiling kettle, and boiled. During the time from the start of boiling of the saccharide solution until being left to stand in a whirlpool, hops are added. Hop extract or a component extracted from hops may be used as hops. The saccharide solution is then transferred to a precipitation tank called a whirlpool. After removing hop residue and curdled protein produced by boiling, the resulting solution is cooled to an appropriate fermentation temperature by a plate cooler. Wort is obtained by the above wort boiling operation.

The obtained wort is fermented, for example, and can be used as a raw material for producing an alcohol-containing beer-like fermented malt beverage. Fermentation of wort may be carried out according to a conventional method. For example, yeast is inoculated into cooled wort, and transferred to a fermentation tank to carry out alcohol fermentation. Furthermore, as an aging step, the resulting fermentation liquid is aged in a liquor storage tank, and stored under a low temperature condition of about 0° C. to be stabilized. Then, as a filtration step, yeast, protein and the like are removed by filtering the fermentation liquid after aging, so that the intended alcohol-containing beer-like fermented malt beverage is obtained.

A method for producing a non-fermented beer-like malt beverage according to the present invention comprises steps which are usually carried out when producing a non-fermented beer-like malt beverage, except that δ-cadinene and cubebol are included in a suitable step. As an example, first, a malt-derived material, polymeric saccharide, a sweet substance and other components are mixed in predetermined amounts to prepare a blend. Then, a predetermined amount of drinking water is added to the blend to prepare a primary raw material liquid. Hops are added to boil the primary raw material liquid, followed by cooling, addition of liquors, and addition of carbonic acid by a carbonation step.

The liquors added serve as an alcohol source, for example, raw material alcohol, shochu, awamori, whisky, brandy, vodka, rum, tequila, gin, spirits and the like can be used. Among these, raw material alcohol is commonly used from the perspective of cost. Raw material alcohol includes those in which an alcohol-fermented liquid using as a raw material molasses obtained from sugarcane and the like is distilled to an ethanol concentration of about 95% by a continuous distillation still, and then diluted as needed, with the ethanol concentration of 45% as a lower limit to be used.

As necessary, precipitates can also be separated and removed in each step by filtration, centrifugation and the like. Also, after the above raw material liquid has been prepared in a thick state, carbonated water may be added. These enable a non-fermented beer-like alcoholic beverage to be simply prepared by using a common production process of a soft drink without having fermentation facilities.

If precipitates are removed before the carbonation step and carbonated water addition step, a causative substance for lees or off-flavors can be removed, which is more preferred. As necessary, filtration and sterilization may also be performed before the carbonation step or carbonated water addition step.

The malt beverage of the present invention preferably exhibits bitterness to some extent. By doing so, when δ-cadinene and cubebol are included, the grain smell is modest, ease of drinking and sharp feeling are improved, and cool feeling is imparted. The malt beverage of the present invention has a bitterness value of 10° EBC or more, and preferably 18° EBC or more. The bitterness of the malt beverage can be increased by means such as increasing the amount of hops used, adding hop extract and the like.

EXAMPLES

The present invention will be further specifically described by Examples below. However, the present invention is not limited to them.

Example 1

Addition Test of δ-Cadinene

Commercially available beer A was prepared. This beer A was divided into 6 aliquots. One of them was additive-free to use it as a control, and to the remaining 5 aliquots was added δ-cadinene so that respective concentrations thereof were 3, 5, 9, 13 and 20 ppb.

Figure 2:
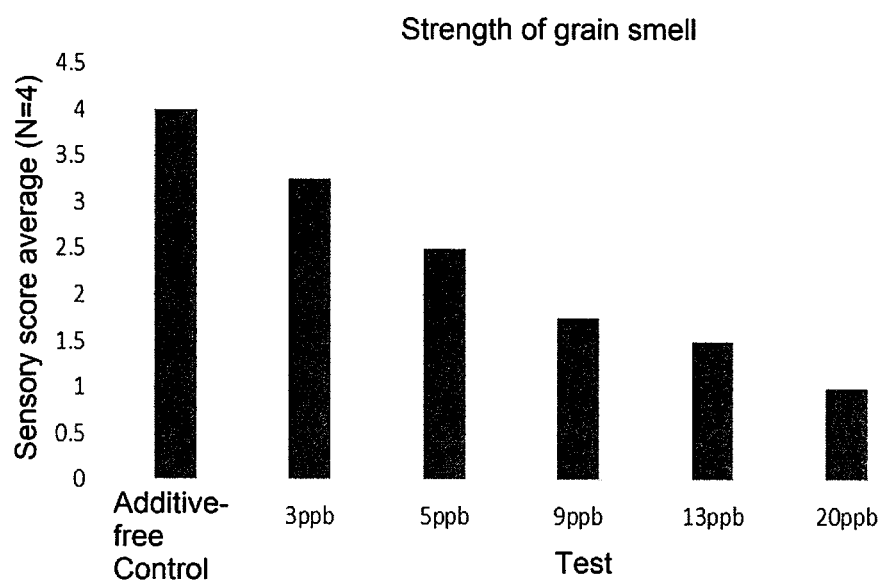
FIG. 2 is a graph showing the relationship between the strength of grain smell of beer and the δ-cadinene concentration.
Figure 3:
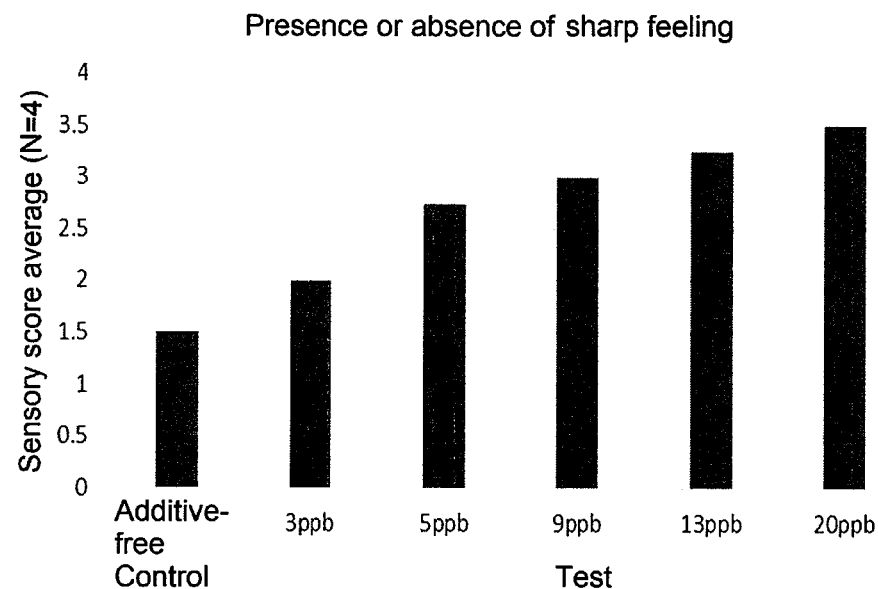
FIG. 3 is a graph showing the relationship between the presence or absence of sharp feeling of beer and the δ-cadinene concentration.

Sensory evaluations of the obtained beers were conducted by 4 well-trained panelists under blind condition. The strength of rich feeling, strength of grain smell, and presence or absence of sharp feeling were provided as performance items to be evaluated. Five grades of evaluation criteria were provided as follows. The scoring results by the respective panelists are shown in Table 1. Furthermore, average values of the scoring results for each concentration are shown in FIGS. 1-3.

(Strength of Rich Feeling)
5: very strong
4: strong
3: strong to some extent
2: slightly weak
1: weak (Strength of Grain Smell)
5: very strong
4: strong
3: strong to some extent
2: slightly weak
1: weak (Presence or Absence of Sharp Feeling)
5: very crisp
4: crisp
3: crisp to some extent
2: slightly less crisp
1: not crisp

TABLE 1

| | | Control | Test | | | | |
|---|---|---|---|---|---|---|---|
| | | Additive-free | 3 ppb | 5 ppb | 9 ppb | 13 ppb | 20 ppb |
| Strength of rich feeling | Panel 1 | 3 | 3 | 3 | 2 | 2 | 2 |
| | Panel 2 | 2 | 2 | 2 | 2 | 2 | 2 |
| | Panel 3 | 3 | 3 | 3 | 3 | 3 | 3 |
| | Panel 4 | 2 | 2 | 3 | 2 | 2 | 2 |
| Strength of grain smell | Panel 1 | 4 | 3 | 3 | 2 | 2 | 1 |
| | Panel 2 | 4 | 4 | 3 | 2 | 2 | 1 |
| | Panel 3 | 4 | 3 | 2 | 2 | 1 | 1 |
| | Panel 4 | 4 | 3 | 2 | 1 | 1 | 1 |
| Presence or absence of sharp feeling | Panel 1 | 1 | 2 | 3 | 3 | 3 | 4 |
| | Panel 2 | 1 | 2 | 2 | 3 | 3 | 3 |
| | Panel 3 | 2 | 2 | 3 | 3 | 3 | 4 |
| | Panel 4 | 2 | 2 | 3 | 3 | 3 | 3 |

Example 2

Addition Test of Cubebol

Figure 4:
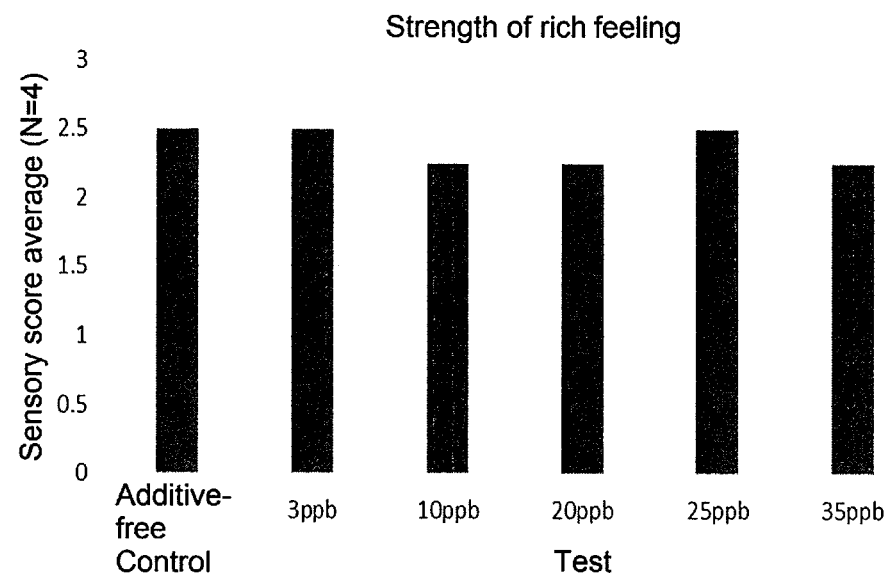
FIG. 4 is a graph showing the relationship between the strength of rich feeling of beer and the cubebol concentration.
Figure 5:
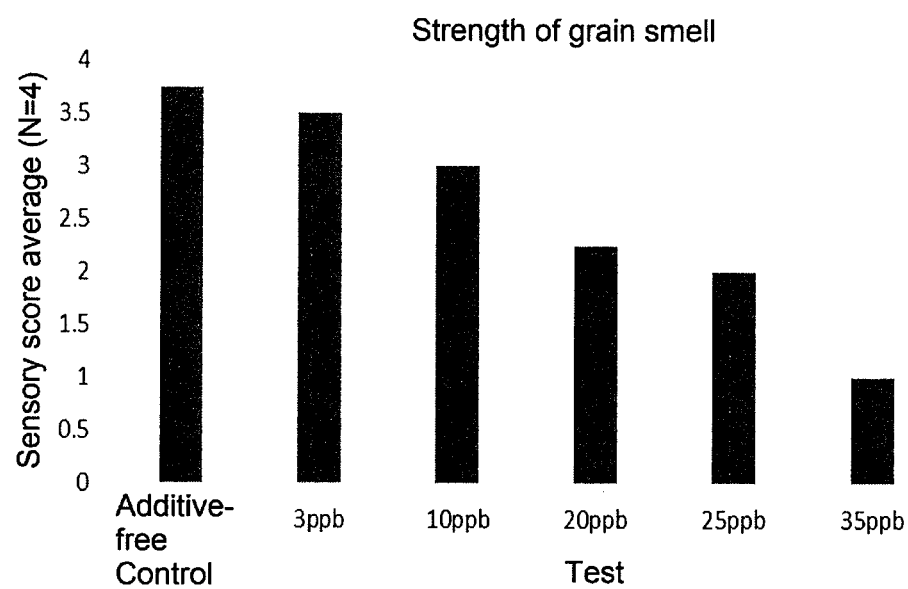
FIG. 5 is a graph showing the relationship between the strength of grain smell of beer and the cubebol concentration.
Figure 6:
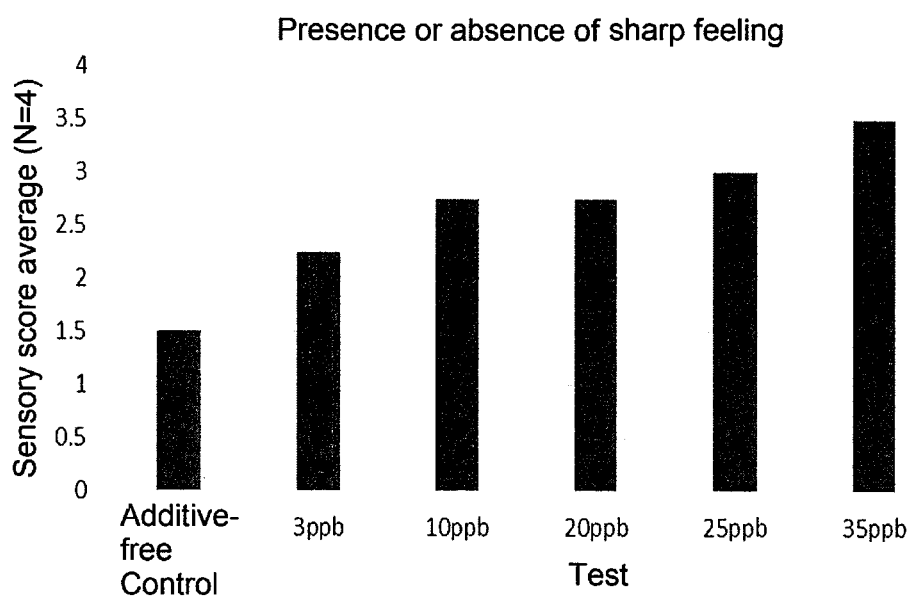
FIG. 6 is a graph showing the relationship between the presence or absence of sharp feeling of beer and the cubebol concentration.

A beer was produced in the same manner as in Example 1 except that, in place of δ-cadinene, cubebol was added so that respective concentrations thereof were 3, 10, 20, 25 and 35 ppb, and sensory evaluations were conducted. The scoring results by the respective panelists are shown in Table 2. Furthermore, average values of the scoring results for each concentration are shown in FIGS. 4-6.

TABLE 2

| | | Control | Test | | | | |
|---|---|---|---|---|---|---|---|
| | | Additive-free | 3 ppb | 10 ppb | 20 ppb | 25 ppb | 35 ppb |
| Strength of rich feeling | Panel 1 | 3 | 3 | 2 | 2 | 2 | 2 |
| | Panel 2 | 2 | 2 | 2 | 2 | 3 | 3 |
| | Panel 3 | 3 | 3 | 3 | 3 | 3 | 2 |
| | Panel 4 | 2 | 2 | 2 | 2 | 2 | 2 |

TABLE 2-continued

| | | Control | Test | | | | |
|---|---|---|---|---|---|---|---|
| | | Additive-free | 3 ppb | 10 ppb | 20 ppb | 25 ppb | 35 ppb |
| Strength of grain smell | Panel 1 | 4 | 3 | 3 | 2 | 2 | 1 |
| | Panel 2 | 4 | 4 | 3 | 2 | 2 | 1 |
| | Panel 3 | 4 | 4 | 3 | 3 | 2 | 1 |
| | Panel 4 | 3 | 3 | 3 | 2 | 2 | 1 |
| Presence or absence of sharp feeling | Panel 1 | 1 | 1 | 2 | 2 | 3 | 4 |
| | Panel 2 | 1 | 2 | 3 | 3 | 3 | 3 |
| | Panel 3 | 2 | 2 | 3 | 3 | 3 | 4 |
| | Panel 4 | 2 | 2 | 3 | 3 | 3 | 3 |

Example 3

<Relationship Between Bitterness Value and Strength of Grain Smell>

(Production of Control Product)

40 kg of crushed malt was mixed with hot water, saccharified and filtered to obtain 160 L of wort. To this were added 0.9 kg of Polaris-variety hops followed by boiling for 60 minutes. After boiling, the mixture was cooled, and a predetermined amount of yeast was added thereto, followed by fermentation for 7 days. The fermented green beer was aged for 10 days, and filtered after cooling.

The bitterness value of the obtained beer was measured. It was 8° EBC.

(Production of Test Products)

40 kg of crushed malt was mixed with hot water, saccharified and filtered to obtain 160 L of wort. To this were added 0.9 kg of Polaris-variety hops followed by boiling for 60 minutes. After boiling, the mixture was cooled, and a predetermined amount of yeast was added thereto, followed by fermentation for 7 days. To the fermented green beer was added isomerized hop extract so that the bitterness value increased by 10° EBC in terms of the product beer. The resulting mixture was then aged and cooled to obtain a product beer.

The bitterness value of the obtained beer was measured. It was 18° EBC.

Sensory evaluations of the obtained beers were conducted by 4 well-trained panelists under blind condition. The strength of grain smell, and presence or absence of sharp feeling were provided as performance items to be evaluated. Five grades of evaluation criteria were provided as follows. Average values of the scoring results by the respective panelists are shown in Table 3.

(Strength of Grain Smell)
5: very strong
4: strong
3: strong to some extent
2: slightly weak
1: weak (Presence or Absence of Sharp Feeling)
5: very crisp
4: crisp
3: crisp to some extent
2: slightly less crisp
1: not crisp (Intensity of Cool Feeling)
5: having a very intense cool feeling
4: having a cool feeling
3: having a cool feeling to some extent
2: having a slightly less intense cool feeling
1: having no cool feeling

TABLE 3

|  | Control product | Test product |
|---|---|---|
| Bitterness value ° EBC | 8 | 18 |
| Grain smell grade (average) | 4.0 | 2.3 |
| Grade of sharp feeling (average) | 2.3 | 4.5 |
| Grade of cool feeling (average) | 1.5 | 4.5 |

From the results of Example 3, it is understood that, in malt beverages using Polaris-variety hops, the malt beverages with higher bitterness values had a reduced grain smell and increased sharp feeling than those having lower bitterness values. It is also understood that the higher the bitterness value, the more intense the cool feeling becomes.

The invention claimed is:

1. A method for reducing a grain smell of a malt beverage, comprising:
   a) adding δ-cadinene and cubebol to the malt beverage or with raw materials while producing the malt beverage to obtain a concentration of 3 to 10 ppb, and 3 to 20 ppb, respectively, in the malt beverage, or
   b) producing a malt beverage by adjusting amounts and types of raw materials to obtain the malt beverage having δ-cadinene at a concentration of 3 to 10 ppb and cubebol at a concentration of 3 to 20 ppb,
   wherein the method further comprises including sesquiterpenes derived from Polaris-variety hops and derivatives therof in step a) or step b), wherein any one of the sesquiterpenes measured using a GC/MS device with 6 ppb concentration of D-linalool serving as an internal standard, and
   whereby the grain smell of the malt beverage is reduced.

2. The method for reducing a grain smell of a malt beverage according to claim 1, wherein the malt beverage has a bitterness value and the method further comprises adjusting the bitterness value of 10° European Brewery Convention (EBC) or more.

3. The method for reducing a grain smell of a malt beverage according to claim 1, wherein the method further comprises including at least one sesquiterpenes selected from the group consisting of 4-epi-cubebol, α-cadinol, α-cubebene, γ-muurolene, α-amorphene and α-muurolene, and derivatives thereof in step a) or step b).

4. The method for reducing a grain smell of a malt beverage according to claim 1, wherein the malt beverage is produced with raw materials comprising grains that comprise 25 wt % or more of malt.

5. The method for reducing a grain smell of a malt beverage according to claim 1, wherein the malt beverage is a beer-like fermented malt beverage.

* * * * *